Sept. 27, 1966   H. C. FELDER ET AL   3,275,234
RECORD CARD PUNCHING MACHINE

Original Filed Oct. 25, 1962   7 Sheets-Sheet 1

FIG. 1

INVENTORS.
HANS CHRISTIAN FELDER
GERHARD SCHILLING
KARL HERMANN JOHANNES ZENNIG
KLAUS JUERGEN BOEHNKE

By C. Norman Hubbard
ATTORNEY

INVENTORS.
HANS CHRISTIAN FELDER
GERHARD SCHILLING
KARL HERMANN JOHANNES ZENNIG
KLAUS JUERGEN BOEHNKE
BY C. Norman Hilliard
ATTORNEY Sept. 27, 1966  H. C. FELDER ET AL  3,275,234
RECORD CARD PUNCHING MACHINE
Original Filed Oct. 25, 1962  7 Sheets-Sheet 5

FIG. 9.

INVENTORS.
HANS CHRISTIAN FELDER
GERHARD SCHILLING.
KARL HERMANN JOHANNES ZENNIG
KLAUS JUERGEN BOEHNKE

BY
ATTORNEY

Sept. 27, 1966  H. C. FELDER ET AL  3,275,234
RECORD CARD PUNCHING MACHINE
Original Filed Oct. 25, 1962  7 Sheets-Sheet 7

FIG. 11.

INVENTORS.
HANS CHRISTIAN FELDER
GERHARD SCHILLING
KARL HERMANN JOHANNES ZENNIG
KLAUS JUERGEN BOEHNKE

BY
ATTORNEY

United States Patent Office 3,275,234
Patented Sept. 27, 1966

3,275,234
RECORD CARD PUNCHING MACHINE
Hans Christian Felder, Bad Homburg vor der Hohe, Gerhard Schilling, Steinbach, Taunus, Karl Hermann Johannes Zennig, Frankfurt am Main-Rodelheim, and Klaus Juergen Boehnke, Kelkheim, Taunus, Germany, assignors to Sperry Rand Corporation, New York, N.Y., a corporation of Delaware
Continuation of application Ser. No. 233,023, Oct. 25, 1962. This application June 15, 1965, Ser. No. 464,249
Claims priority, application Germany, Nov. 4, 1961,
R 31,400 R 31,401, R 31,402, R 31,403
27 Claims. (Cl. 234—58)

This is a continuation of application Serial No. 233,023 filed Oct. 25, 1962.

This invention relates generally to information recording mechanisms and has more particular reference to machines commonly known as key punches which operate to punch data entered from a keyboard into a punch card in a column by column manner.

In machines of this class stepper mechanism is employed for advancing the card in steps through the punch and die section, and this mechanism has customarily comprised some form of escapement means of complicated design which is impositive in operation and is not adaptable for high operating speeds as required for modern punch card equipment. Likewise the punch and die sections of machines of this class ordinarily comprise an assembly of parts whose voluminous mass does not readily enable any significant increase of operating speed. The complicated structure of these portions of existing machines renders the servicing and replacement of individual worn parts very difficult. In the heretofore known machines of this class the card stepping mechanism and punching mechanism is activated in conjunction with each key operation and, accordingly, if an error is made by the operator the error is immediately entered in the card requiring that the card be discarded. Also, in the known machines in order that they may perform duplicating operations involving the punching of constant data in a series of successive cards they require the provision of card sensing means disposed at a subsequent stage in the feed path for reading the information punched into a card and controlling the punching mechanism accordingly for recording the information in the following card.

The machine according to the invention is provided with a magnetic core storage into which data is entered from the keyboard while the card remains stationary in the feed path. At the completion of the storage input operation, which loads the storage with all the data to be punched into one card, an output operation is initiated during which time the card is step-fed at high speed by the novel stepping mechanism, acting in a positive manner unlike conventional escapement mechanism, to the high speed punching mechanism which perforates the card column by column to record data being simultaneously read-out from the storage unit. In the case of an error on the part of the operator, this may be corrected by erasing the error from the storage unit and entering the correct data in place thereof thus avoiding the need for rejecting the card. When it is desired to duplicate constant data in a series of cards, means are provided for rewriting this information into storage during the read-out operation thus avoiding the necessity for providing a separate sensing stage for retaining constant data to be duplicated in a series of cards. Means are also provided to enable write-in to the storage unit at the same time as information is being read-out, thereby permitting the keyboard entry of data for a subsequent card to be started before the read-out of the data for the preceding card is completed.

The inventive concept is such that it enables the various components of the machine to be made in more or less standardized assemblies enabling the machine to be adapted merely by the interchange of appropriate assemblies for either the well-known 80-column card or the well-known 90-column card. In addition, for applications wherein it is desired that the cards after being punched be stacked in the reverse order from that in which they were stacked in the loading magazine, a stacking mechanism of simplified and improved design is provided for this purpose.

It is therefore an object of the invention to provide an improved keyboard controlled machine for punching record cards in a step by step manner.

It is a further object of the invention to provide in a keyboard controlled punching machine a high speed storage unit for retaining data entered from the keyboard and controlling the punching mechanism in accordance therewith.

It is a further object of the invention to provide in a keyboard controlled punching machine improved means for stepping the record card through the punch and die section.

It is a still further object of the invention to provide an improved punch unit for a keyboard controlled punching machine.

It is a still further object of the invention to provide in a machine of the character described an improved means for stacking the cards in a card receptacle.

Further objects of the invention together with the features contributing thereto and the advantages accruing therefrom will be apparent from the following description when read in conjunction with the drawings wherein.

The record medium, in the present instance a punched card C, is fed from the card magazine M by a picker knife 2 mounted on a card slide 1 biased by a flat spring 3. The flat spring 3 bears against a cam 5 and follows the movement of its circumference so that the card slide 1 will be moved forward. A shaft 4 supporting the cam 5 is driven by a motor by way of a clutch (not shown). The card moves through the throat gap 6 of the magazine to card feed rolls of the card viewing station of the card transport path in which station the card is visible to the operator.

A card feed roll 8 at the viewing station of the card transport path is driven from the main shaft 10 of the machine through a bevel gear 11 and shaft 12. A spur gear 13 fixed on shaft 12 drives the next feed roll 14 of the card transport path by means of a toothed belt 15.

The driven card feed rolls 8, 14, cooperate with spring loaded pressure rolls 16, 17 pressing the card against the card feed rolls 8, 14, thus, assuring the movement of the card on the card transport path. The movement of the card through the viewing station of the card transport path is continuous.

Figure 1:
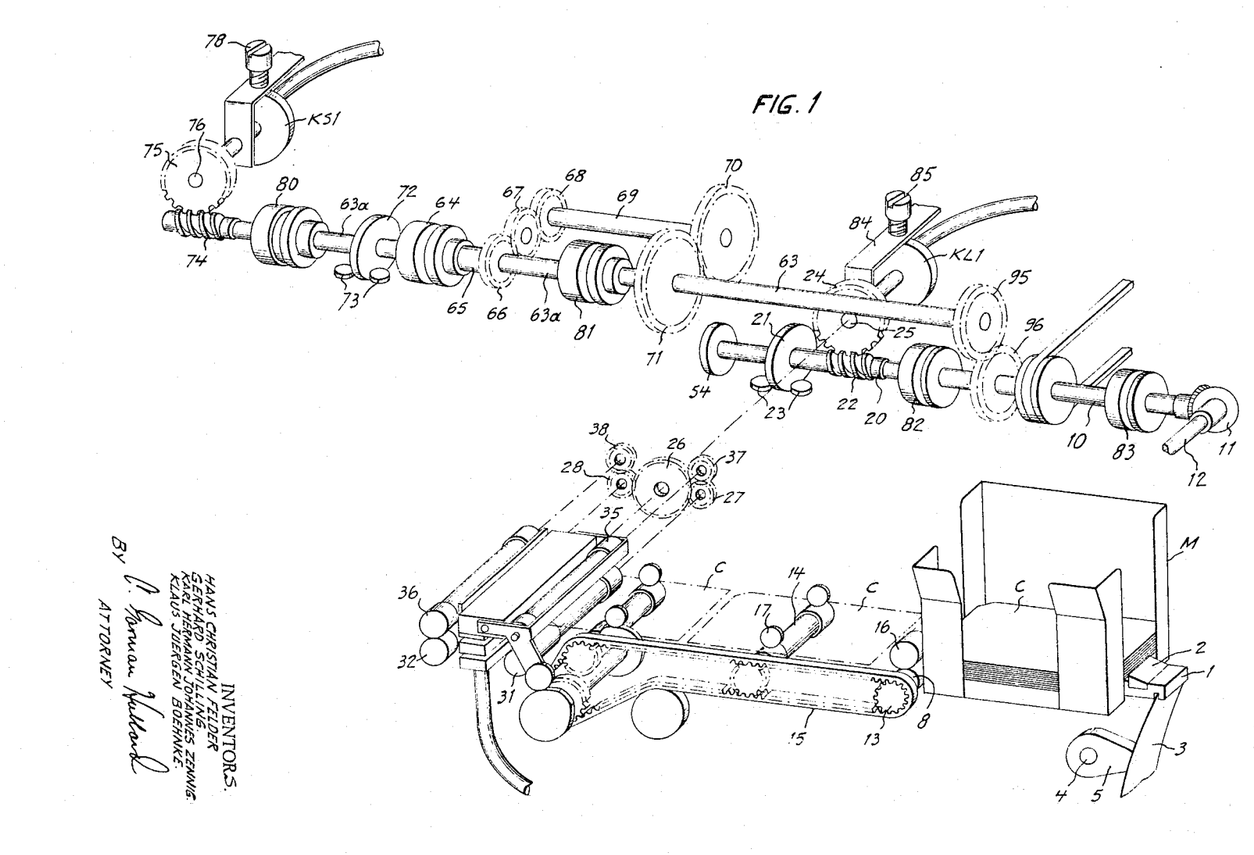
FIG. 1 is a perspective view illustrating schematically the various assemblies and their driving interconnections.
Figure 2:
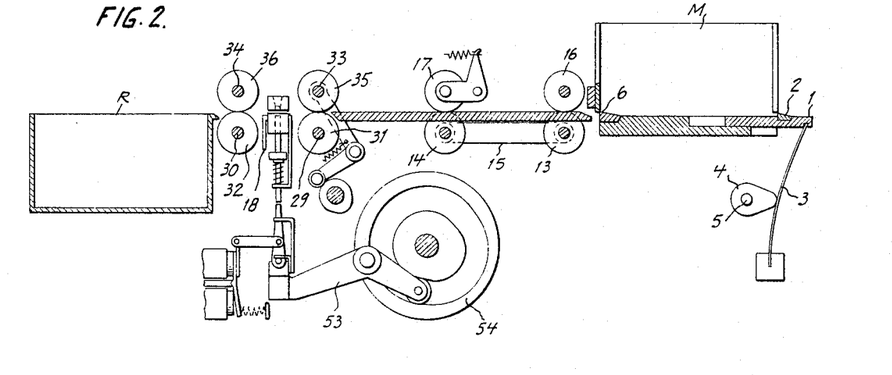
FIG. 2 is a sectional view in side elevation showing the card transport path.

As soon as the card has left the card transport path assigned to the viewing station it proceeds to a card stop 18, see FIG. 2, operated in any well-known manner and associated with the stepper mechanism for the punch and die section. The stepper mechanism is driven directly by the main shaft 10, thus assuring that its movement is synchronized with the feed rolls at the viewing station of the card transport path. The stepper mechanism comprises an axially shiftable bushing 20, see FIGS. 1 and 3, mounted on the main shaft 10 and carrying a face cam 21 and a worm gear 22. The face cam 21 is guided by a pair of stationary rollers 23 which serve as a face cam backrest. The worm gear 22 engages a worm wheel 24 carried by a shaft 25. The shaft 25 also carries a spur gear 26 engaging spur gears 27, 28 mounted on shafts 29, 30 which also carry card feed rolls 31, 32, respectively. In order to provide a positive drive mechanism for cards at this stage of the transport path the opposed feed rolls 35, 36 paired with rolls 31, 32 are carried by shafts 33, 34 mounting spur wheels 37, 38 engaging with and driven by the spur wheels 27, 28 respectively.

Figure 3:
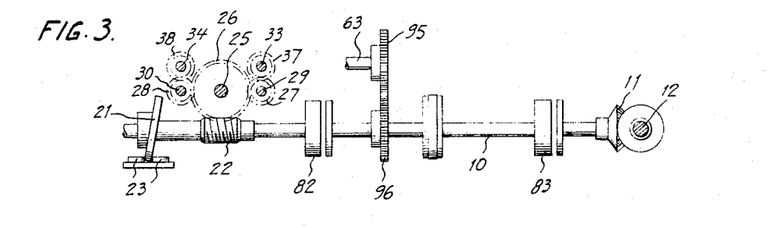
FIG. 3 is a side elevation of the card stepping mechanism.

The face cam 21, guided in the stationary pair of rollers 23 as aforementioned, is provided with a lateral pitch which corresponds to the pitch of the teeth on the worm gear 22. The shape of the face cam 21 is such that the worm gear 22 is given not only a rotary motion but also a shifting movement which causes periodic acceleration and deceleration of the worm wheel 24. Since the pitch of the face cam corresponds to the pitch of the worm gear teeth it will be apparent that when the worm gear is shifted in the decelerating direction, the effect of the deceleration will be to cause a stopping of the rotation of the worm wheel for a corresponding period. Since the rotary motion of worm wheel 24 is transferred through spur wheel 26, shaft 25, to spur gears 27, 28 for driving the card feed rolls 31, 32, as above described, the latter are intermittently driven in step fashion so as to advance the cards C step by step along the card transport path associated with the punch and die section of the machine. The speed of rotation of the main shaft 10 along with the pitch of the face cam 21 and the pitch of the worm gear 22 are predetermined so that the intermittent rotary motion of the card feed rolls causes a column by column advance of the card. The design of the stepping mechanism just described lends itself to extremely rapid operation, and it will be noted that the driving connection to the feed rolls is a positive one at all times as distinguished from more conventional escapement means which intermittently engage and disengage a yieldably or impositively driven member. Since the length of each feed step is dependent upon the pitch of the face cam 21 and the teeth of the worm gear 22 it will be readily apparent that the mechanism may be adapted for use with cards having different columnar spacings merely by substituting an appropriate assembly of these parts.

The punch and die section of the machine is located between the pairs of card feed rolls 31, 35 and 32, 36 as shown in FIG. 2. This section consists of a die plate 41 and a punch guide plate 42, see FIG. 4. The punch element 43 is slidably fitted in the guide plate 42 and a punch support 44 prevents it from dropping out of the assembly. A compression spring 45 presses the punch element 43 slightly against a punch retractor 46 which reciprocates with the set-up mechanism now to be described. Below the punches 43 are tiltable levers or interposers 48 pivotally mounted in pan bearings formed in a lever support 47. The levers are secured in the pan bearings by means of a rod 49 extending through each lever at its pivotal axis and retained by a comb shaped guard 50.

Figure 4:
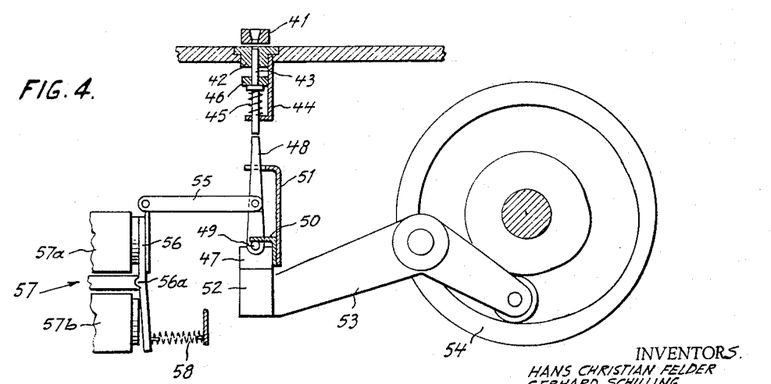
FIG. 4 is a sectional view in side elevation of the punch and die section.

The tiltable levers are guided in a comb bar 51 secure to the support 47 and serving also as a stop element for limiting the tilt of the levers. The lever support 47 rests on a punch beam 52 of a follower lever 53 operated by a cyclically driven punch cam 54.

Each of the interposer levers 48 is connected to the upper end of a two-legged armature 56 by means of a connecting link 55, the armature acting through the link to swing or tilt the lever 48 into and out of axial alignment with its associated punch 43. The actuator 57 is provided with two coils 57a, 57b which may alternately be energized to attract either the upper or lower leg of the armature 56. For this purpose the armature is formed with a central nose 56a resting on a bridge between the two coils 57a, 57b of the actuator 57. Energization of the coil 57a attracts the upper leg of the armature 56 so as to move the interposer lever 48 into alignment with its associated punch 43 thus setting up the punch for perforating the card when the punch support 47 is raised by operation of the cam 54. Energization of the coil 57b by attracting the other leg of the armature 56 swings the interposer or tiltable lever 48 out of alignment with its associated punch to its restored setting so as to prevent punching when the punch lever support is subsequently raised.

It has been found that the provision of a lever support 47 formed with pan bearings for mounting the interposer lever 48 is a most advantageous feature since it enables the punching pressure to be better absorbed than would be the case if the interposers were pivotally mounted on more conventional means such as pins or studs. The structure of the punch and die section according to this invention as above described constitutes a simplified mechanism requiring a minimum number of parts which are easily accessible so as to be easily replaceable. Moreover, the mechanism is such as to be easily convertible for use with 90 column cards or 80 conlumn cards merely by replacing the assembly consisting of the punches 43, the punch guide 42 and the punch die 41. It will, of course, be understood that although there has been shown by way of an example a double coil actuator which includes a coil for restoring the interposer levers the device could, if desired, be operated under control of a single coil actuator in conjunction with a compression spring 58 for performing the function of the second actuator coil.

Figure 5:
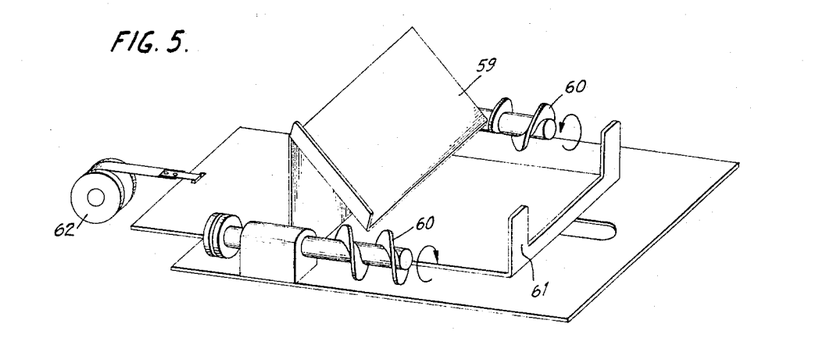
FIG. 5 is a perspective view illustrating the card stacking mechanism.

Upon leaving the punch and die section, the card is ejected to a card receiver R. In FIG. 2 the receiver is shown in conventional form wherein the punched card falls freely to the bottom of the receiver and following cards fall on the first card thus placing the first card at the bottom of the stack. In many accounting procedures this sequential order of stacking the punched cards is undesirable, and for this reason an improved stacking mechanism has been provided as hereinafter to be described for turning the cards over so as to place the first card fed at the top of the stack, etc. The improved stacking mechanism in accordance with the invention is shown in FIG. 5. The punched card after being fed out of the punch and die section falls on a guide plate 59 mounted in a sloping plane. Due to the slope of the guide plate 59 the card slides down the plate and between the threads of worms 60 which are driven in opposite directions. The threads turn the card into a vertical upright position with their bottom edges resting in the bed of a yieldable retainer 61. The worms 60 advance the card in the upright position up against the backrest portion of the retainer 61, and the following cards are stacked one against the other while the retainer 61 is advanced the extent of one card thickness as each card is added to the stack. A return spring 62 restores the retainer in its home position when the cards are removed from the receiver.

Figure 6:
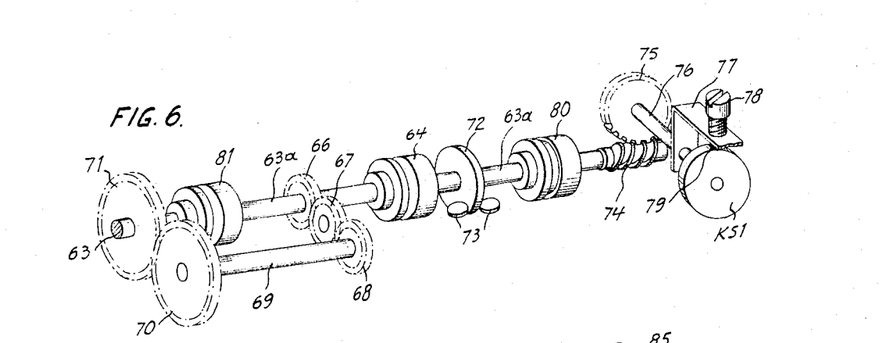
FIG. 6 is a perspective view illustrating the storage input stepper mechanism.

In carrying out the concepts of this invention, the machine is equipped with input stepper mechanism illustrated in FIG. 6. The shaft 63 of the input stepper mechanism, which is driven from the main shaft 10, see FIG. 1, through gears 95, 96, is interrupted in a magnetic clutch 81 for directly driving shaft 63a. Shaft 63a is also controlled by a magnetic clutch 64 carried by a bushing 65 mounted on the shaft 63 in a manner which enables the shaft to rotate within the bushing. The free end of the bushing 65 is provided with a spur gear 66 driving a spur gear 68, mounted on a shaft 69, through an idler gear 67. The other end of shaft 69 supports a spur gear 70 engaging a spur gear 71 fixed on the shaft 63.

Since the shaft 63a may be driven from the shaft 63 directly by the magnetic clutch 81 or indirectly through the gearing including shaft 69, bushing 65 and the magnetic clutch 64, these magnetic clutches and associated gearing comprise mechanism for reversing the direction of rotation of shaft 63a which is accomplished by energizing the magnetic clutch 64 to couple shaft 63a with the bushing 65 and at the same time de-energizing the magnetic clutch 81. The shaft 63a is provided with a face cam 72 guided between a stationary pair of rollers 73 which serve as a backrest for the cam in the same manner as heretofore described in connection with the output stepper mechanism face cam 21, see FIG. 1. The face cam 72 has a lateral pitch so that an intermittent rotary motion may be transferred to a worm wheel 75 by means of a worm gear 74 mounted on the shaft 63a. It will be understood that the shaft 63a is so mounted in its bearings (not shown) and is so coupled with the magnetic clutches 64, 81 as to be axially shiftable so as to periodically accelerate and decelerate the worm wheel 75 in accordance with the pitch of the cam 72. The worm wheel 75 is mounted on a shaft 76 which carries at its opposite end a brush yoke 77 supporting a brush holder 78 and a brush 79. Brush 79 wipes over a commutator KS1 associated with the core storage unit hereinafter to be described. The commutator KS1 is operative only during storage input operations and since it is driven from the main shaft 10, which also drives the output stepper mechanism, these magnetic clutches 64, 81 provide means which permit the shaft 63a to be disconnected from the main drive and the output stepper mechanism during output operations. In order to assure immediate stoppage of the shaft 63a when either of the clutches 64, 81 is de-energized, a magnetic brake 80 is mounted in the shaft 63a for this purpose.

Figure 7:
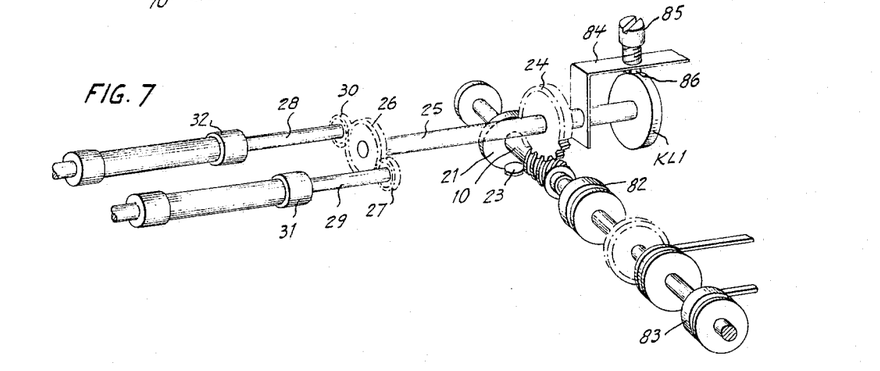
FIG. 7 is a perspective view illustrating the storage output stepper mechanism.

The output stepper mechanism is the means controlling the feed of the card through the punch and die section and has previously been described. As seen in FIGS. 1 and 7 the output stepper mechanism is driven from the main shaft 10 through a magnetic clutch 82 so that the output stepper mechanism may be disconnected during the operation of the storage input mechanism. The shaft 10 is driven through a feed belt from a motor, not shown. A magnetic clutch 83 is provided for coupling the main shaft 10 to the drive mechanism including shaft 12 for the feed rolls associated with the viewing station in the card transport path, heretofore described. The magnetic clutches and brakes are controlled by relay circuit associated with the storage unit. The stepping movement of the output stepper mechanism through the action of the worm gear 22 periodically accelerating and decelerating the worm wheel 24 has previously been described. The shaft 25 supporting the worm wheel 24 also carries at its opposite end a brush yoke 84 supporting a brush holder 85 and a brush 86 which wipes over the segments of a commutator KL1. Data is fed through the input stepper mechanism into the storage unit under control of an alpha-numerical keyboard, and the data stored in the storage unit is subsequently read-out for punching into a card through the output stepper mechanism.

The storage unit comprises a magnetic core matrix with relay and electronic circuits controlling the various functions. The data to be stored is available in the form of voltage or current impulses generated by the pressing of a key 92 of the keyboard, and coding is achieved by means of a diode matrix 93. The storage unit may be of either 90 column or 80 column capacity depending upon whether it is to be used for 90 or 80 column cards respectively. In either case the columns of the storage unit are addressed by means of commutators which select a column of magnetic cores along the Y axis or coordinate of the magnetic core matrix. The 90 column storage unit shown in FIG. 8 will first be described.

Figure 8:
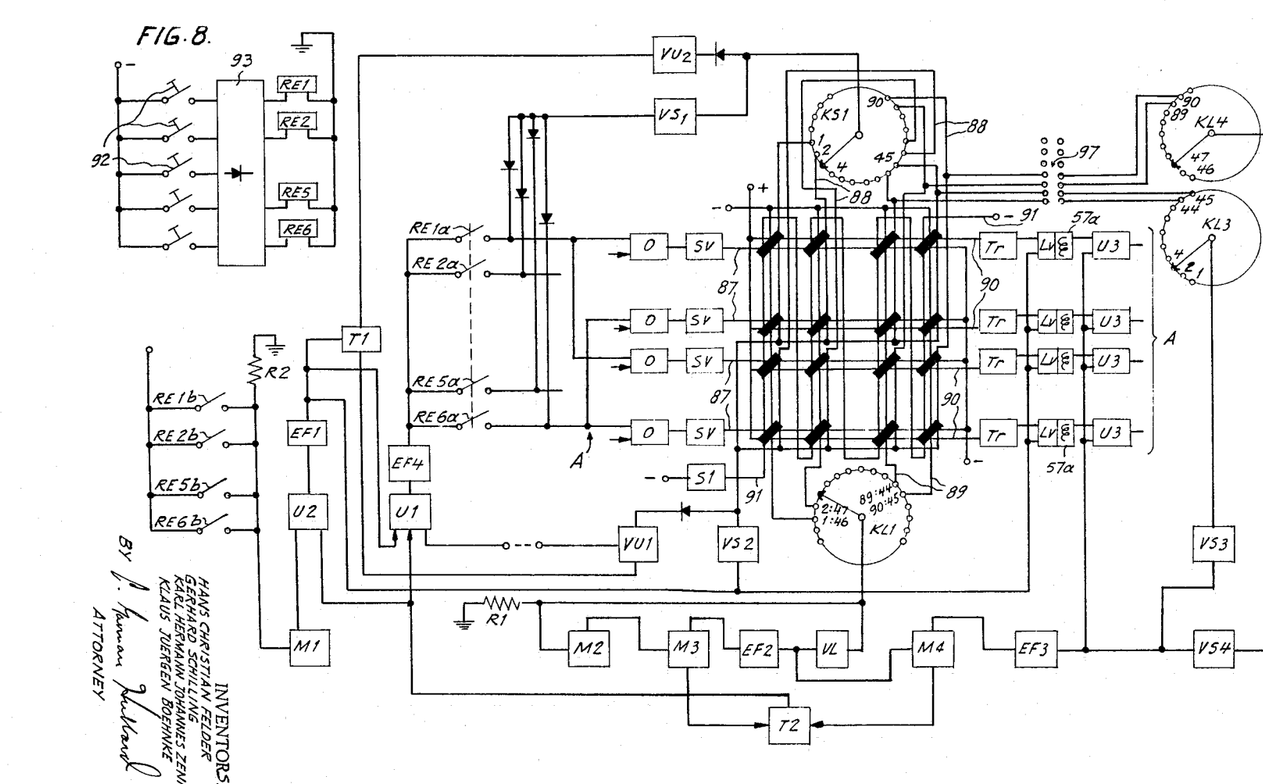
FIG. 8 is a logical diagram of the magnetic core storage unit in an embodiment adapted for 90 column cards.

The cores are biased by means of a current. Recording or writing-in data in the storage unit is performed by transmitting a current in the X (row-wise) as well as in the Y (column-wise) direction or coordinate. Reading of the storage unit is accomplished by applying to the cores of each column a pulse of sufficient amplitude and of opposite polarity so as to reverse or restore to its original condition any core which may have been switched during the write-in operation.

For recording purposes, two recording leads are associated with each core, the leads 87 running row-wise in the X direction or axis, leads 88 running column-wise in the Y direction or axis. The 90 column matrix shown in FIG. 8 is divided column-wise into two groups of cores of six cores each to correspond with the columnar arrangement of index positions on the well-known 90 column card. A separate recording lead 88 is provided for each group of six cores. In the X direction the matrix consists of 45 columns, each column consisting of two groups of six cores. The recording leads 87 in the X direction thus pass through a corresponding core in each of the 45 columns. Reading leads 89 are separate lines and pass through all twelve cores of a Y column. Read-out leads 90 are arranged in parallel with the X axis recording leads 87 and therefore pass through a core in each of the 45 columns.

The matrix input leads 87 along the X axis are connected in parallel on one side and on the other side each is connected to an upper group and lower group record amplifier SV each of which is preceded by an OR gate. One end of the read-out lines along the X axis is connected in parallel and the other end is connected to a read-out amplifier LV preceded by matching transformers TR.

One end of each of the reading lines running along the Y axis is connected in parallel and the other end terminates in a forty-five position commutator KL1 preceded by an amplifier VL. Each recording lead 88 of the Y axis is also interconnected in parallel at one end and at the other end terminates in a ninety pole commutator KS1. The parallel ends of the leads 88 are connected with two amplifiers VU1 and VS2 while the input to the commutator is provided with amplifiers VU2 and VS1.

A biasing line 91 runs through all five hundred and forty cores of the matrix in one direction. This line improves the operation of the cores and is also used for clearing the matrix. Data is fed into the matrix Y column by Y column, and distinction is made between the upper group of six cores and the lower group of six cores within each matrix column. The upper groups of six cores in each of the forty-five Y columns is read into first and then the forty-five lower groups of cores is written into. Data is read-out from the matrix also in a column by column manner but in the read-out both groups of six cores each of a Y column is read simultaneously.

The operation is as follows. A pulse representing numerical or alphabetical information is generated by actuation of one of the keys 92 of the keyboard. The diode matrix 93 encodes the pulse and energizes the appropriate combination of relays RE1–6 whose *a* contacts lead the pulses via OR gates to the amplifiers SV for the recording leads 87 of the X axis. The recording amplifiers SV allow current to flow in the respective lines in both upper and lower core groups of the matrix. At the same time a pulse is transmitted over a parallel circuit through diodes to the Y axis recording amplifier VS1. The commutator KS1 transmits the amplified pulse to a selected one of the Y axis recording leads 85. Any core which simultaneously received pulses in both directions, i.e., over a line 87 and line 88 will be switched.

The cores which receive a pulse over only one of the leads 87 or 88 are not switched. After this procedure the commutator KS1 may be activated by the input stepper mechanism under control of the keyboard so as to move into its next position for recording in the next column of the matrix.

For reading the data in the matrix in output operations the commutator KL1 is activated by the output stepper mechanism, said commutator being connected to each of the reading lines 89 and generating a small leakage pulse from negative supply to ground through a resistor R1. This pulse trips a one shot multivibrator M2 which in turn trips a one shot multivibrator M3. The pulse time of multivibrator M2 is about one millisecond in order to bridge any chatter when the commutator KL1 hits its segments. The trailing edge of the pulse of multivibrator M2 controls the multivibrator M3 whose pulse time is about twenty microseconds. The multivibrator M3 activates through an emitter stage EF2 a reading pulse amplifier VL which is fed through the commutator KL1 and generates a reading pulse in the selected reading line 89. Any core in the selected column which had been switched during the recording operation will now be reversed by the reading pulse. This generates a short pulse in the crossing read-out lines 90 which is fed to the reading output amplifiers LV and thence to an associated punch set up actuator coil 57a by way of the matching transformers TR. The commutator KL1 is then stepped by the output stepper mechanism to enable the reading of the next column.

Since it may happen that recording and reading may occur at the same time, means are provided for blocking one of the operations, i.e., the recording operation. It is known that the recording pulse generated by operation of a key has a duration of about fifteen milliseconds. The reading pulse is therefore limited to about twenty microseconds by one shot multivibrator M3 which is about twice the time required to switch the core. During this time the key generated recording voltage is blocked by the output of trigger T2 which is fed to an AND gate U1 controlling through an emitter stage EF4 the voltage for the *a* contacts of the coding relays RE so that the key pulse temporarily is not effective. Since twenty microseconds represents a much shorter time duration than fifteen milliseconds, this temporary interruption of the recording current may be neglected. The recording pulse is initially delayed for a clearing operation by a one shot multivibrator M1 whose pulse length is one hundred microseconds and which is tripped by the closure of the *b* contacts of the coding relays RE. The recording pulse is also interrupted for twenty microseconds by one shot multivibrator M4 which operates to generate a rewrite pulse as hereinafter more fully described.

Figure 10:
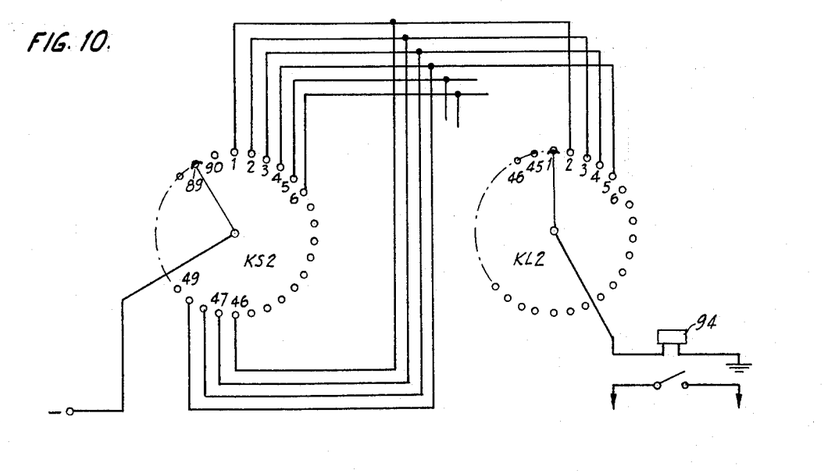
FIG. 10 is a diagram of an over-take lock in an embodiment adapted for 90 column cards.

Means are provided for preventing any overlap of the recording and reading cycles at the same matrix column. This is accomplished by two commutators KS2 and KL2, see FIG. 10, which run parallel to the recording and reading commutators KS1 and KL1, respectively. They are so interconnected as to complete a circuit when the reading commutator is one step ahead of the recording commutator. If a circuit is completed through both commutators, a relay 94 energizes and blocks the recording operation until the regular advance step has been re-established.

Clearing a column of a matrix in conjunction with each input operation is brought about by the one shot multivibrator M1, see FIG. 8, which is tripped by the *b* contacts of the contacts of the coding relays RE and provides a pulse length of one hundred microseconds. The pulse is fed through an AND gate U2 and an emitter sequence stage EF1 to set a trigger T1. The trigger T1 when set reverses the amplifiers VU2 and VU1 enabling a reverse current flow in the selected column of six cores. The output of the emitter sequence stage EF1 is fed to the amplifier VS2 causing current flow in the selected column of cores. The output of the emitter sequence stage EF1 also blocks the reading amplifiers LV and also by means of the AND gate U1 blocks the voltage for the recording amplifiers SV. The current passing through the selected column of cores reverses the polarity of the cores which may have previously been switched thereby in effect clearing the selected column of the matrix. It is thus possible to clear a storage column prior to or during the input of new data so that errors may be corrected and constant values erased. All positions of the matrix, i.e., all cores, may be cleared by the use of the bias line 91 when connected to a suitable current source in any well-known manner.

In order to enable the storing of constant data, the outputs of the reading amplifiers LV, in addition to energizing the actuator coils 57a, are fed back to the OR gates preceding the recording amplifiers SV by way of AND gates U3. A one shot multivibrator M4 is actuated for twenty microseconds by the trailing edge of the pulse generated by the one shot multivibrator M3 which provides the reading pulse as herein before described. The multivibrator M4 controls two recording amplifiers VS3 and VS4 by way of an emitter sequence stage EF3 and delivers the AND condition for the AND gates U3 behind the readout amplifier LV. The recording amplifiers VS3 and VS4 are assigned to the contact arms of two commutators KL3 and KL4 whose segments are connected in parallel to the Y direction recording lines 88 through a plugboard 97. Both commutators KL3 and KL4 are driven in synchronism with the reading commutator KL1, the commutator KL3 being assigned to the upper groups of six core columns and the commutator KL4 being assigned to the lower groups of six core columns of the storage matrix. If any one of the columns of six cores have been defined as a re-write column by means of the plugboard, this column will receive recording current in the Y direction by way of the recording amplifier VS3 or VS4 and will also receive recording current in the X direction during the multivibrator M4 pulse period by virtue of the read-out pulse being fed back through AND gates U3 and the recording amplifiers SV. During this re-write process key voltage at the *a* contacts of the coding relays will be blocked by operation of the trigger T2 which as before mentioned is set by the output of multivibrator M3 and which is reset by the trailing edge of the multivibrator M4.

Figure 9:
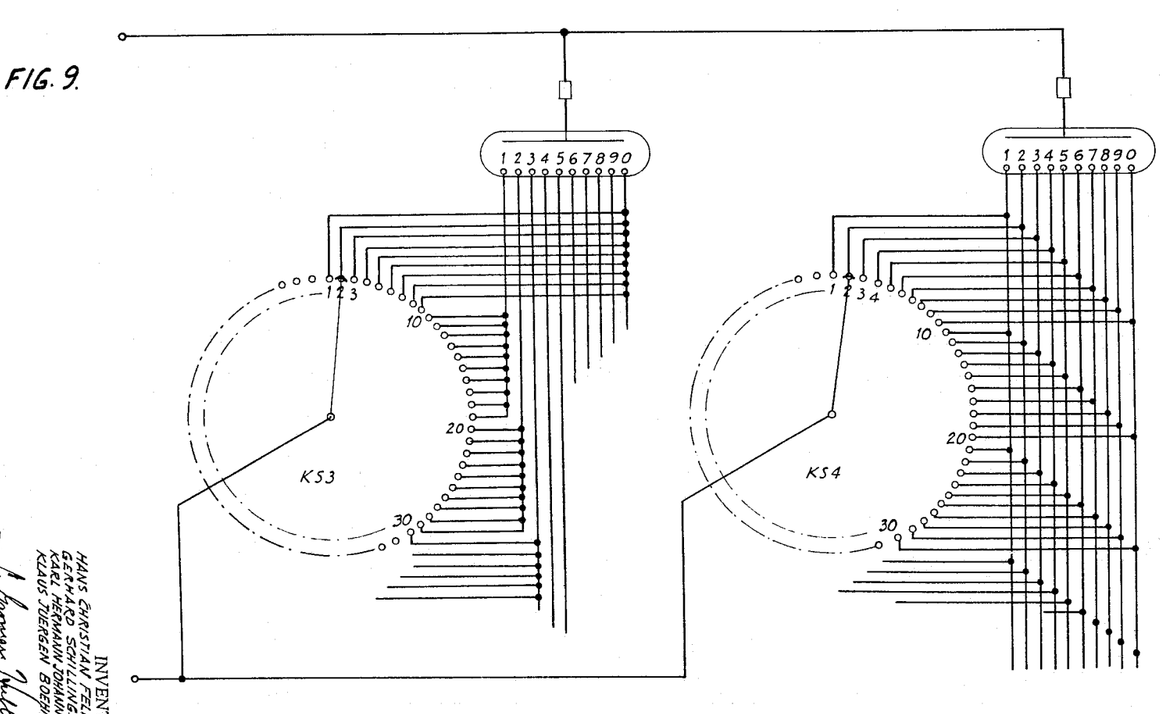
FIG. 9 is a diagram of a column indicator.

Means are provided for indicating the column which at any time during the recording operation is being addressed by the recording commutator. As can be seen in FIG. 9, commutators KS3 and KS4 are provided and driven in synchronism with the recording commutator KS1. Each commutator is connected to a respective series of digit indicator tubes. The tubes associated with commutator KS4 indicate units whereas the tubes associated with commutator KS3 indicate the tens denomination. The tubes light up in appropriate sequence as the commutators advance during the recording operation.

Figure 11:
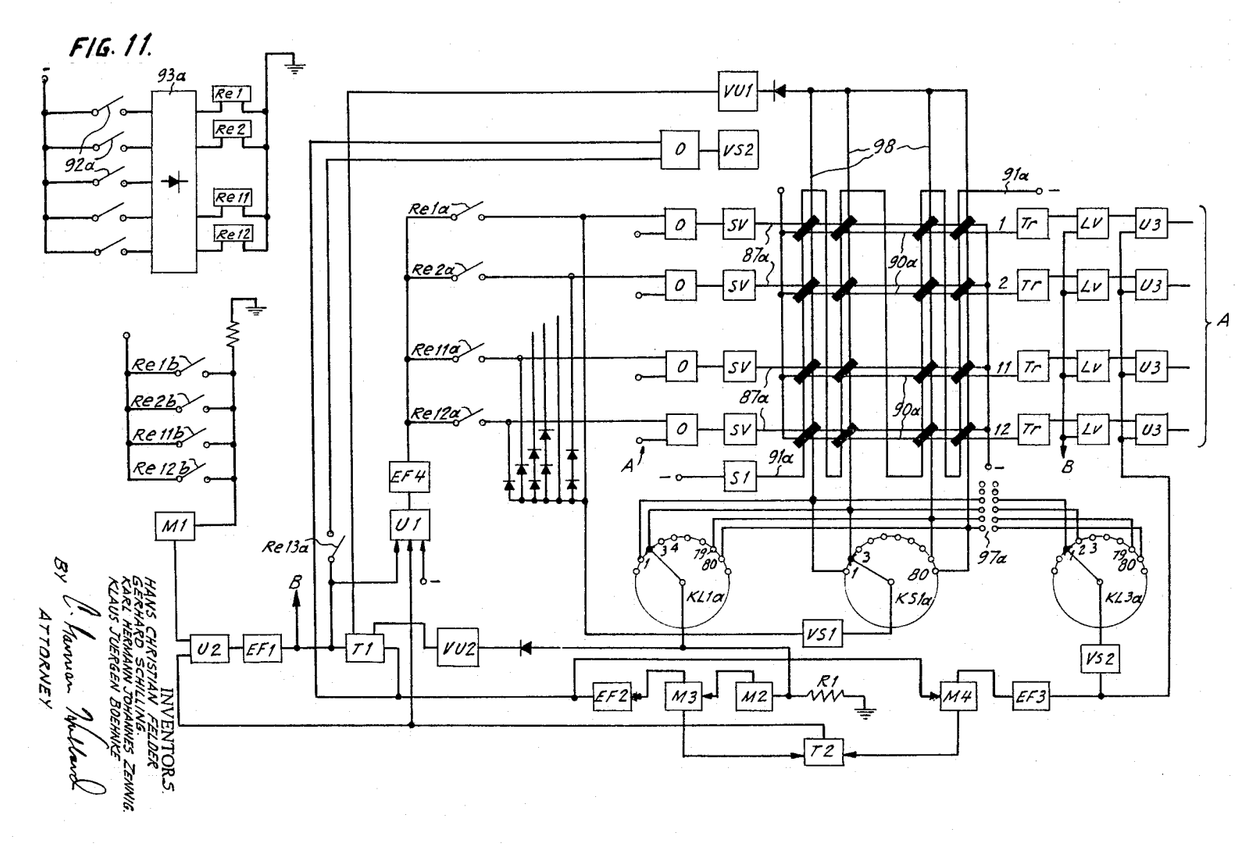
FIG. 11 is a logical diagram of a magnetic core storage unit in an embodiment adapted for 80 column cards.
Figure 12:
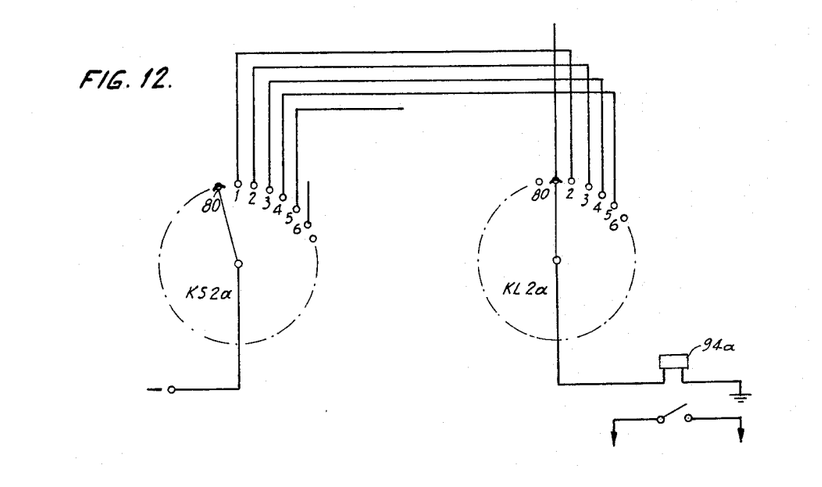
FIG. 12 is a diagram of an over-take lock in an embodiment designed for 80 column cards.

The structure of an eighty column storage matrix is basically similar to that of the ninety column matrix as can be seen by reference to FIG. 11 wherein corresponding elements of the diagram carries the same designations as applied to the diagram of FIG. 8. In the eighty column matrix the cores are arranged in eighty columns of twelve each, and the columns are not divided into upper and lower groups of six cores each as was the case with the ninety column matrix. The recording and reading lines in the column-wise or Y direction may thus be combined and represented by a single line 98. One end of this line is connected in parallel to amplifiers VU1 and VS2. The other end of this line leads to the recording commutator KS1a which receives its input from the recording amplifier VS1. The reading commutator KL1a is connected in parallel with the recording commutator KS1a, and the re-write commutator KL3a, of which there is only one in this embodiment since the cores are not arranged in separate groups of six each, is wired by way of a plugboard 97a. The recording and reading lines 87a, 90a in the row-wise or X direction are wired in the same manner as are those of the ninety column embodiment. The same holds true for the bias line 91a passing through all of the cores of the matrix. In addition similar means are provided for preventing an overlap of the recording or reading cycles at the same column, said means including as shown in FIG. 12 a commutator KS2a driven in synchronism with the recording commutator KS1a and a commutator KL2a driven in synchronism with the reading commutator KL1a, these being connected serially that when the reading commutator is only one step ahead of the recording commutator circuit will be completed for blocking the recording operation.

The process of recording or reading is similar to that heretobefore described in connection with the ninety column embodiment. However, since the same line is used for both operations, the U amplifiers which are effective for a respective one of the operations must be blocked for the opposite operation, i.e., amplifier VU1 is operated and amplifier VU2 blocked during a recording operation, whereas VU2 is operated and VU1 is blocked during a reading or clearing operation. The trigger T1, as in the case of the ninety column embodiment, controlled by multivibrator M3 or M1, respectively, operates to reverse the amplifiers VU1, VU2.

While there has been shown and described what are regarded as preferred embodiments of the invention, it should of course be realized that changes in form could be made without departing from the spirit of the invention, and it is therefore intended that the inventions be not limited to the exact forms herein shown and described nor to anything less than the whole of the invention as hereinbefore set forth and as hereinafter claimed.

What we claim as new and desire to secure by Letters Patent is:

1. In a keyboard controlled machine for punching a record card column by column, a punching mechanism cyclically operable for perforating a record column, means for feeding records through said punching mechanism, a memory having a plurality of addressable locations for storing data entered from said keyboard, means for reading said memory in sequential locations to selectively control the punches of said punching mechanism, and output stepper means coupled to said reading means and said feeding means for driving said feeding means intermittently in steps to advance the card column by column to said punching mechanism in synchronism with the sequential operation of said reading means.

2. The invention according to claim 1 wherein said output stepper means includes a driving member coupled to a continuously rotating shaft and a driven member coupled to said feeding means, and cam means carried by said driving member for periodically accelerating and decelerating said driven member.

3. The invention according to claim 1 wherein said memory is a magnetic core matrix having a plurality of columns, and each of said columns is a separate location in said memory.

4. The invention according to claim 3 wherein said reading means includes individual leads for each column of said matrix, and a commutator driven by said output stepper means for successively connecting said leads to a reading circuit.

5. The invention according to claim 3 including recording means for effecting the storage of keyboard generated data in said matrix, and input stepper means operating in synchronism with said keyboard for stepping said recording means to store data column by column in said matrix.

6. The invention according to claim 5 wherein said recording means includes individual recording leads for each column of said matrix, and commutator driven by said input stepper means for successively connecting said recording leads to a recording circuit.

7. The invention according to claim 6 wherein each recording line is associated with a group of cores corresponding to one record column and wherein said matrix includes individual reading lines each associated with the cores of two groups and effective in output operations for simultaneously reading the data stored in the cores of both groups.

8. The invention according to claim 7 including a commutator driven by said output stepper means for successively connecting said reading lines to a reading circuit.

9. The invention according to claim 2 wherein the driving connection between said driving member and said driven member includes a driven worm wheel and driving worm gear, said worm gear being axially shiftable under the influence of said cam means for accelerating and decelerating said worm wheel.

10. The invention according to claim 9 wherein said cam means and said worm gear are carried by a bushing rotatably driven by said shaft and axially shiftable relative thereto, said cam means cooperating with stationary guides for imparting the axial shifting movement to said bushing.

11. The invention according to claim 10 wherein the pitch of said cam means for effecting the shifting of said bushing in the decelerating direction is equal to the pitch of said worm gear, whereby the driving impetus effected by the rotation of said worm gear is offset to cause a temporary stopping of said driven worm wheel.

12. In a keyboard controlled machine for punching a record card column by column, a punching mechanism selectively operable for perforating a record column, means for feeding record cards through said punching mechanism, a magnetic core matrix for temporarily storing the data to be punched, input stepper means activated under control of said keyboard for addressing individual columns of said matrix for recording therein during input operations, output stepper means for addressing individual columns of said matrix in step with the passage of said record card through said punch mechanism in output operations, means for generating recording pulses effective for switching selected cores of said matrix in an input operation, means for generating reading pulses effective for reversing in output operations the cores switched during an input operation to produce a read-out pulse, and means activated during the time of a reading pulse for interrupting any simultaneously generated recording pulse, whereby respective columns of said matrix may be recorded in and read from at the same time.

13. The invention according to claim 12 including means for preventing the overlap of an input operation and an output operation in the same column of said matrix comprising, a blocking commutator driven by said input stepper means and a blocking commutator driven by said output stepper means, said commutators being serially connected to complete a circuit for disabling said input stepper means when the output driven commutator is one step ahead of said input driven commutator.

14. The invention according to claim 12 including indicator means for displaying the columnar position of said input stepper means, said indicator means comprising a panel of units order digit tubes, a panel of tens order digit tubes, and commutator means driven by said input stepper means for energizing in succession the tubes of said units order panel upon each stepping of said input stepper means and the tubes of said tens order panel after ten steppings of said input stepper means.

15. The invention according to claim 12 wherein each recording pulse is fed over a column-wise recording lead and a row-wise recording lead to jointly effect the switching of a core disposed at the intersection of said leads and including rewrite means for relaying the read-out pulse produced by the reversing of a core to the row-wise recording lead for the same core, said rewrite means operating to simultaneously generate a pulse in the column-wise recording lead for said core to effect jointly with a read-out pulse the return of said core to a switched condition.

16. The invention according to claim 15 wherein the pulses generated by said rewrite means are carried to said column-wise recording leads through a rewrite commutator driven by said output stepper means.

17. The invention according to claim 16 wherein said rewrite commutator is connected to said columnwise recording leads through a plugboard settable to select the columns of said matrix in which rewriting is to be effected.

18. In a keyboard controlled machine for punching a record card column by column, a punching mechanism cyclically operable for perforating a record column, a magnetic core matrix for storing the data to be punched in said record medium by said punching mechanism, a recording lead for each column of said matrix, a recording lead for each row of said matrix, means controlled by said keyboard for generating recording pulses in said row-wise and column-wise leads for switching a core disposed at the intersection of said leads during an input operation, a reading lead for each column of said matrix, means for generating reading pulses effective for reversing in output operation the cores switched during input operations to produce a read-out pulse, amplifying means for transmitting pulses of predetermined polarity to said column-wise recording leads during input operations, and clearing means activated at the start of an input operation for temporarily delaying said recording pulse generating means and for simultaneously reversing said amplifier means so as to transmit through a column-wise recording lead a pulse of polarity opposite to that of said recording pulse, whereby any data stored in a column is erased prior to the generation of a recording pulse for the matrix column.

19. The invention according to claim 18 including blocking means controlled by said clearing means for inhibiting any readout pulse generated by the activation of said clearing means.

20. In a record processing machine having a magazine for containing a plurality of records in stacked formation, means for transporting a record along a feed path, and means for advancing the bottom record of said stack into said feed path, mechanism for receiving records from said feed path and for stacking the records in sequential order reverse to their original order when stacked in said magazine, said mechanism comprising a yieldable retainer in the form of a record receptacle having a bed portion for supporting the records along one edge and a backrest portion for retaining the records upright on the said bed portion, worm means engageable with opposite edges of a record for turning the record into upright position relative to said bed portion and advancing it along the bed portion and into surface contact with said backrest portion, each succeeding record being advanced into surface contact with the preceding record to thereby accumulate in said receptacle in stacked formation, and means for guiding each record delivered from said feed path into edge engagement with said worm means.

21. The invention according to claim 20 wherein said worm means comprise a pair of spirally threaded worm members disposed along opposite sides of said retainer, one of said members being threaded reversely to and rotated in a direction opposite to that of the other.

22. A data recorder comprising, a record bearing member for holding a plurality of character respresentations in the form of a block of information, recording device, a keyboard, a coincident current memory having a separate character storage location for each character in a block of information, stepping means coupled to said memory for addressing said memory in sequential locations, means responsive to the successive actuation of the keys on said keyboard to transmit the characters represented by said successive actuations to successive storage locations in said memory, means operative for passing aid record bearing member past said recording device, and read-out means operative during the operatoin of the last named means for transmitting characters to said recording device from successive locations in said memory whereby the block of information stored in said memory is transferred to said record bearing medium.

23. In a keyboard controlled machine for recording data on a record in discrete lines, a cyclically operable recording mechanism for recording a line of data corresponding to a character on said record, means for feeding said record through said recording mechanism, a memory having plurality of addressable locations for storing lines of data corresponding to characters entered from said keyboard, means for reading said memory in sequential locations to selectively control said recording mechanism, and output means coupled to said means for reading and said means for feeding for driving said means for feeding in synchronism with the sequential operation of said means for reading.

24. In a keyboard controlled machine for recording data on a record in discrete lines, a cyclically operable recording mechanism for recording a line of data corresponding to a character on said record, means for feeding said record through said recording mechanism, a magnetic core matrix memory having a plurality of addressable locations for storing lines of data corresponding to characters entered from said keyboard, recording means for effecting the storage of keyboard generated data in said matrix, an input means operating in synchronism with said keyboard for controling said means to store data, column by column, in said matrix, means for reading said matrix column by column in sequential locations to selectively control said recording mechanism, and output means coupled to said means for reading and said means for feeding for driving said means for feeding in synchronism with the sequential operation of said means for reading.

25. A data recorder comprising, a keyboard entry device for generating a plurality of different signal groups, wherein each group represents a characted, a coincident current memory having separately addressable storage locations for each of said characters, address means for addressing each of said storage locations in sequential ascending order, means coupling said keyboard to said memory for transferring each of said characters to a different sequential location specified by said address means and means for controlling said address means to address said storage locations in descending order.

26. A data recorder comprising, a keyboard entry device for generating a plurality of different signal groups, wherein each group represents a character, a coincident current matrix memory comprising a plurality of magnetizable cores, said memory having separately addressable storage locations for each of said characters, each location comprising one line of cores in the matrix, addressing means for addressing each of said storage locations in sequential ascending order, said addressing means operating in synchronism with said keyboard entry device, recording means coupling said keyboard entry device to said memory for recording each of said characters in a different sequential location in said memory specified by said addressing means and means for controlling said addressing means to address said storage locations in descending order.

27. A data recorder comprising, a record bearing member for holding a plurality of character representations in the form of a block of information units, a recording device, a keyboard, a coincident current memory having a separate character storage location for each character in a block of information units, stepping means coupled to said memory for addressing said memory in sequential locations, means responsive to the successive actuations of the keys on said keyboard to transmit the characters represented by said successive actuations in successive storage locations in said memory, means operative for passing said record bearing member past said recording device, read-out means operative during the operation of the last named means for transmitting characters to said recording device from successive locations in said memory whereby the block of information stored in said memory is transferred to said record bearing medium and selectively operable read-in means actuated in synchronism with said read-out means for receiving the characters read-out of said memory and returning selected ones of said characters back to the location in said memory from whence they were read-out.

References Cited by the Examiner
UNITED STATES PATENTS

| | | | |
|---|---|---|---|
| 2,647,581 | 4/1953 | Gardinor et al. | 234—128 |
| 2,926,730 | 3/1960 | Greunke | 234—55 |
| 2,964,238 | 12/1960 | King et al. | 234—58 |
| 3,011,697 | 12/1961 | Baker | 234—128 |
| 3,043,501 | 7/1962 | Pudelko et al. | 234—55 |

WILLIAM S. LAWSON, *Primary Examiner.*

UNITED STATES PATENT OFFICE
CERTIFICATE OF CORRECTION

Patent No. 3,275,234                        September 27, 1966

Hans Christian Felder et al.

It is hereby certified that error appears in the above numbered patent requiring correction and that the said Letters Patent should read as corrected below.

Column 12, lines 18 and 19, for "operatoin" read -- operation --; line 45, for "controling said means" read -- controlling said recording means --; line 55, for "characted" read -- character --.

Signed and sealed this 26th day of September 1967.

(SEAL)
Attest:

ERNEST W. SWIDER
Attesting Officer

EDWARD J. BRENNER
Commissioner of Patents